United States Patent

Boggs, deceased

[15] 3,646,464

[45] Feb. 29, 1972

[54] ACTIVE DELAY AND AMPLITUDE EQUALIZERS

[72] Inventor: Albert Boggs, deceased, late of New York, N.Y. by Emily Eloise Boggs, Executrix

[73] Assignee: Sangamo Electric Company, Springfield, Ill.

[22] Filed: Feb. 13, 1970

[21] Appl. No.: 11,204

[52] U.S. Cl. ....................330/30 D, 330/107, 330/109
[51] Int. Cl. ....................H03f 1/36
[58] Field of Search ....................330/9, 30 D, 69, 107, 109; 333/80 T

[56] References Cited

UNITED STATES PATENTS

| | | | |
|---|---|---|---|
| 3,509,369 | 4/1970 | Crouse et al. | 330/69 X |
| 3,519,947 | 7/1970 | Thelan | 330/30 D |
| 3,051,920 | 8/1962 | Sandberg | 333/80 T |

*Primary Examiner*—Roy Lake
*Assistant Examiner*—Lawrence J. Dahl
*Attorney*—Johnson, Dienner, Emrich, Verbeck & Wagner

[57] ABSTRACT

An adjustable active delay and amplitude equalizer circuit, including operational amplifiers, and resistive and reactive circuit elements, in which adjustment for amplitude can be made substantially independent of adjustment for delay.

10 Claims, 4 Drawing Figures

INVENTOR.
ALBERT BOGGS deceased
EXECUTRIX EMILY ELOISE BOGGS

BY Johnson, Dienner, Emrich, Verbeck & Wagner
ATTYS.

ACTIVE DELAY AND AMPLITUDE EQUALIZERS

BACKGROUND OF THE INVENTION

1. Field of the Invention

This invention relates to wave transmission lines, and, more particularly, to adjustable delay and amplitude equalizers for use with such lines.

2. Description of the Prior Art

Presently available adjustable equalizers for equalizing both delay and amplitude exhibit undesirable interaction effects. This is evidenced by the fact that when an adjustment is made for delay and then for amplitude, a subsequent adjustment must be made for delay, and then a further adjustment for amplitude, etc., to the desired accuracy. The phenomenon becomes more pronounced when the amount of amplitude and delay to be corrected is large.

Furthermore, since as technology advances it becomes necessary to transmit data at ever increasing rates, more sophisticated circuit equalization is required and this further complicates the adjustment process.

SUMMARY OF THE INVENTION

This invention provides an adjustable delay and amplitude equalizer circuit in which adjustment for amplitude may be made substantially independent of adjustment for delay.

In one embodiment for example, the equalizer circuit provides for amplitude variation of ±3.5 db. with only a 4 percent change in the previously set delay. In view of the minimization of interactions between the amplitude and delay which occur when amplitude adjustments are made, the equalizer can be more quickly adjusted to the desired degree of accuracy.

According to the invention, the equalizer circuit comprises an operational amplifier connected as a differential amplifier combined with resistive and reactive circuit elements to realize a voltage transfer function given by the following expression:

$$\frac{E_2}{E_1}=\frac{R_2Z_1-R_1Z_2}{R_1Z_1+R_2Z_2}$$

in which $R_1$ and $R_2$ are resistances connected to one input of the operational amplifier, and $Z_1$ and $Z_2$ are impedances connected to the other input of the operational amplifier as shown in FIG. 1. Impedance $Z_1$ may be realized as resistance and impedance $Z_2$ may be realized as the series combination of an inductance, a capacitance and a second resistance which represents the dissipation of the reactive elements. It is this unavoidable dissipation which accounts for insertion loss of the equalizer circuit. This loss is most pronounced at the frequency of maximum delay and varies with the value of maximum delay although the equivalent resistance itself may be substantially independent of frequency.

In accordance with the present invention, this insertion loss may be enhanced over that provided by the reactive elements, the loss may be completely eliminated, or a gain may be secured by including in the equalizer circuit a controlled source of energy, which may be embodied as a negative immittance converter, to compensate for the energy lost through dissipation. The provision for overcompensation or undercompensation for losses through the use of a controlled source of energy permits this equalizer circuit to be used in a greater number of applications.

DESCRIPTION OF THE PREFERRED EMBODIMENTS

Figure 1:
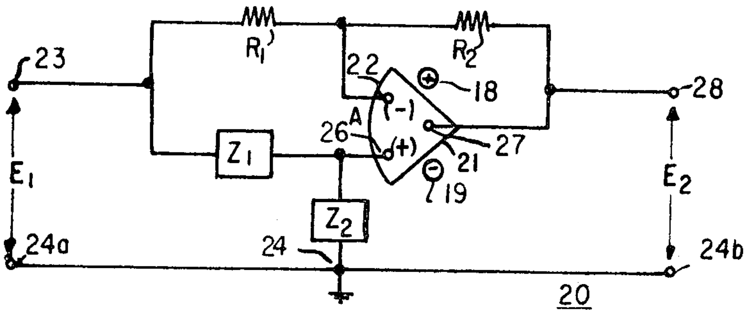
FIG. 1 is a schematic representation of a basic equalizer circuit provided in accordance with this invention.

Referring to FIG. 1, a delay and amplitude equalizer circuit 20 of the present invention includes an operational amplifier 21 connected to operate as a differential amplifier.

One input terminal 22 of the amplifier 21 is connected through a resistor $R_1$ to an input terminal 23 of the circuit 20. A second input terminal 26 of the amplifier is connected to the input terminal 23 of circuit 20 through an impedance $Z_1$ so that a signal path, that is frequency dependent, is provided between the input of the circuit and the other amplifier input 26. Terminal 26 of amplifier 21 is also connected to ground (terminal 24) through an impedance $Z_2$, which may include variable elements. Power is supplied to the operational amplifier 21 over a pair of terminals 18 and 19. Such a connection is implied for all the operational amplifier circuits shown in FIGS. 2–4.

An output terminal 27 of amplifier 21 is connected directly to an output terminal 28 of circuit 20, and also to the input terminal 22 of amplifier 21 in a feedback connection through a resistor $R_2$.

When the equalizer circuit 20 is connected in series with a communication circuit, telephone line or the like, a signal from the communication circuit, impressed upon input terminals 23 and 24*a* of equalizer circuit 20 will be passed over separate signal paths to the two inputs 22 and 26 of the amplifier 21.

The differential amplifier 21 is operable to provide an output signal the amplitude of which varies with frequency in accordance with the signals coupled to the amplifier.

The amplitude of the equalization signal provided by the equalizer circuit 20 can be adjusted by varying the magnitudes of the circuit elements, particularly impedance $Z_2$. A change in the impedance $Z_2$ will cause a corresponding change in the amplitude of the equalizing signal. Moreover, this change will be substantially ineffective to change the delay characteristic provided by the equalizer circuit.

Figure 2:
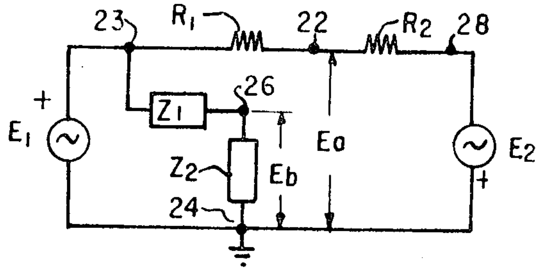
FIG. 2 is an equivalent circuit of the equalizer circuit of FIG. 1.

The operating characteristics of the equalizer circuit 20 will become more apparent by considering the transfer function of the circuit which is derived by the use of the equivalent equalizer circuit of FIG. 1 shown in FIG. 2. The reference characters in FIG. 2 refer to like points or elements shown in FIG. 1.

First, calculating *Ea*, the voltage at amplifier input terminal 22:

$$I=\frac{E_1+E_2}{R_1+R_2} \quad (1)$$

$$Ea=E_1-R_1I \quad (2)$$

$$=E_1-\frac{R_1(E_1+E_2)}{R_1+R_2}$$

or, after simplifying, $$Ea=\frac{E_1R_2-E_2R_1}{R_1+R_2} \quad (3)$$

Calculating $E_b$, the voltage at amplifier input terminal 26:

$$E_b=\frac{E_1Z_2}{Z_1+Z_2} \quad (4)$$

The gain A of the operational amplifier is much greater than unity. Thus, it can be shown that the voltage *Ea* at input terminal 22 relative to ground (terminal 24) is approximately equal to the voltage $E_b$ at input terminal 26. Accordingly, equating equations (3) and (4) above, simplifying, and solving for the ratio of the output voltage $E_2$ to the input voltage $E_1$, the equalizer circuit 20 is shown to realize the following voltage transfer function:

$$\frac{E_2}{E_1}=\frac{R_2Z_1-R_1Z_2}{R_1Z_1+R_2Z_2} \quad (5)$$

When $R_1$ equals $R_2$, the transfer function becomes:

$$\frac{E_2}{E_1}=\frac{Z_1-Z_2}{Z_1+Z_2} \quad (6)$$

Figure 3:
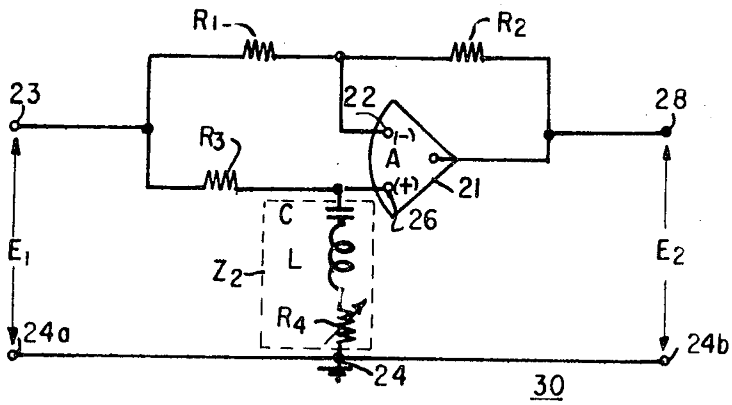
FIG. 3 is a schematic circuit diagram of an equalizer circuit, similar to that shown in FIG. 1, having passive elements in the input circuit.

No restrictions are inherent in the composition of impedances $Z_1$ and $Z_2$, but for amplitude equalization, substantially independent of delay equalization, the equalizer circuit 20 of FIG. 1 may be implemented as shown in FIG. 3 by substituting a resistor $R_3$ for the impedance $Z_1$ which is connected between input terminal 26 of the amplifier 21 and terminal 23 of the circuit 20, and implementing the impedance $Z_2$ which is connected between terminal 26 of the amplifier and ground, with a series RLC circuit including a capacitor C, inductor L, and a resistor $R_4$.

The transfer function for this equalizer circuit 30 can be found by substituting for $Z_1$ and $Z_2$ in equation (6):

$$\frac{E_2}{E_1}=\frac{R_3-[R_4+JW_oL(f)]}{R_3+[R_4+JW_oL(f)]} \tag{7}$$

where $$F=\frac{W}{W_o}-\frac{W_o}{W}$$

The resistor $R_4$ represents the losses due to the reactive components L and C through dissipation. This dissipation, if not compensated for, will provide a loss when the equalizer circuit is connected, for example, in a communication line.

The amplitude of the equalization signal provided by the equalizer circuit 30 can be adjusted by varying the magnitudes of the circuit elements, particularly the resistive portion of impedance $Z_2$.

Figure 4:
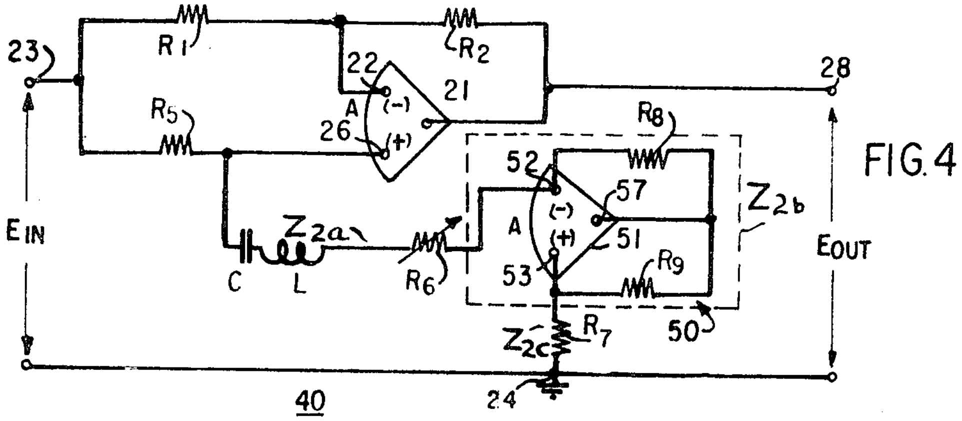
FIG. 4 is a schematic circuit diagram of an equalizer circuit of the type shown in FIG. 1 having active and passive elements in the input circuit.

A second, preferred, embodiment of the invention is shown in FIG. 4. In the active delay and equalizer circuit 40 of FIG. 4, the impedance $Z_1$ of the circuit 20 shown in FIG. 1, is comprised of a resistor $R_5$ connected between amplifier input terminal 26 and input terminal 23 of the equalizer circuit 40. The impedance $Z_2$ includes a first impedance $Z_{2a}$ having a series resonant circuit including a resistor $R_6$, an inductor L and a capacitor C connected to the input terminal 26 of amplifier 21 and to an input terminal 52 of a second impedance $Z_{2b}$ comprised of an active circuit 50 including an amplifier 51. A second input 53 of the amplifier 51 is connected through a third impedance $Z_{2c}$, comprised of a resistor $R_7$, to ground (terminal 24) which provides a voltage reference for the equalizer circuit 40. The output 57 of the amplifier 51 is connected back to the inputs 52 and 53 of the amplifier through resistors $R_8$ and $R_9$, respectively.

The active circuit 50 may be, for example, a negative immittance converter (NIC) of the type shown, for instance, in "Handbook of Operational Amplifier Active Networks," Burr-Brown Research Corporation, 1966, pages 45–48. A negative immittance converter is a two-port device characterized by the property that the input impedance seen at either port is the negative, times a constant $K$, of the impedance connected to the other port. The constant $K$ is the gain of the active circuit 50 as determined by resistor $R_8$ and $R_9$ and is equal to the ratio of the magnitude of resistor $R_8$ to resistor $R_9$. If resistor $R_8$ is equal in value to resistor $R_9$, the gain is unity, and the constant $K$ is equal to 1. The impedance connected to the output of the NIC is the resistor $R_7$.

With reference to the equalizer circuit 40 shown in FIG. 4, it is pointed out that the reactive branch $Z_{2a}$ of impedance $Z_2$ is connected to ground or the point of reference potential through the operational amplifier 51 and the resistor $R_7$. In accordance with the characteristics of the active circuit 50 embodied as an NIC, the resistance of resistor $R_7$ connected from terminal 53 of amplifier 51 to ground effectively appears at the input terminals 52 and 53 of the amplifier 51 as a negative resistance equal in magnitude to $R_7$ times $K$, the gain of the circuit 50. This is equivalent to adding in the basic circuit ground connection a negative resistance equal in magnitude to resistance $R_7$.

The voltage transfer function for the circuit of FIG. 4 thus becomes:

$$\frac{E_2}{E_1}=\frac{R_5-[R_6-KR_7+JW_oL(F)]}{R_5+[R_6-KR_7+JW_oL(F)]} \tag{8}$$

where $K$ equals $R_8/R_9$ and $(F)$ equals $(W/W_o)-(W_o/W)$ or $$\frac{E_2}{E_1}=\frac{[1-(n)]\,P+JF}{[1+(n)]\,P+JF} \tag{9}$$

where $(n)$ equals $(R_6-KR_7)/R_5$ and $P$ equals $R_5/W_oL$.

At the L-C resonant frequency $W_o$, $F$ is zero, and $$\frac{E_2}{E_1}=\frac{1-(n)}{1+(n)} \tag{10}$$

The magnitude of this ratio may be less than, equal to, or greater than unity dependent upon whether $KR_7$ is less than, equal to or greater than $R_6$, that is, $(n)$ is positive, $(n)$ is zero, or $(n)$ is negative.

In a practical realization of this equalizer circuit, resistor $R_8$ may be equal in value to $R_9$ so that the gain $K$ of the circuit 50 is unity and the magnitude of the constant $K$ is equal to unity. With the magnitude of $R_7$ being fixed, the transfer function is dependent upon the magnitude of $R_6$ embodied as an adjustable resistor. Resistor $R_6$, which is connected in series with the inductor L thus provides a means for obtaining positive, zero or negative values of $(n)$.

By way of example $(n)$ equals 0.2 when the components of equalizer 40 have the following values:

| | |
|---|---|
| C=80.4mfd. | L=315mh. |
| $R_1$=10K ohms | $R_7$=1870 ohms |
| $R_2$=10K ohms | $R_8$=10K ohms |
| $R_5$=900 ohms | $R_9$=10K ohms |
| $R_6$=1690 ohms | |

(including RAC of inductor L)

When this value for $(n)$ is substituted into equation 10 it is seen that a 3.5 db. gain is obtained by the equalizer circuit 40.

It can be shown that a value can be selected for resistor $R_6$ whereby $(n)$ is equal to −0.2 in which case a −3.5 db. loss will be provided by the circuit.

Accordingly, the loss which is introduced by the reactive components L and C may be enhanced by increasing the value of the resistance $R_6$ to provide a loss which is greater than that due to the normal dissipation. On the other hand, the loss may be completely eliminated or a gain secured by decreasing the value of $R_6$ to the magnitude where $(n)$ is zero or less than zero. At such values, the controlled source of energy 50, embodied as an NIC, provides the energy that is equal to, or greater than the energy lost through the dissipation of the reactive elements.

As mentioned above, adjustments in amplitude equalization are made substantially independent of delay. For example, when $(n)$ equals zero, the equalizer compensates for insertion loss and thus, the transfer function is unity.

The envelope delay at the resonant frequency $W_o$ is given by the expression:

$$T_o=\frac{4}{W_oP\,(1-n^2)} \tag{11}$$

When $N$=0, $$T_o=(4)/(W_oP) \tag{11a}$$

When the value of resistor $R_6$ is 1,690 ohms, $(n)$ equals 0.2, and it can be shown by substituting appropriate component values into equation (11) that, at a frequency of 1.0 kHz., the equalizer circuit will provide a delay of 1.4 milliseconds.

Moreover, when $n=\pm 0.2$, $$T_o=(4.16)/(W_oP) \tag{11b}$$

Thus, comparing equation (*11a*) with equation (*11b*), it is apparent that the introduction of either a gain or a loss 3.5 db. results in a variation in the chosen delay of only 4 percent.

It is claimed:

1. An adjustable delay and amplitude equalizer circuit comprising a circuit input terminal, a circuit output terminal, and a point of reference potential, a differential amplifier having a first and a second input terminal and an output terminal connected to said circuit output terminal, resistor means connecting a signal input over said circuit input terminal to said first amplifier input terminal, further resistor means connecting a signal output from said amplifier output terminal to said first amplifier input terminal, first impedance means for coupling said signal input over said circuit input terminal to said second amplifier input terminal, and second impedance means connecting said second amplifier input terminal to said point of reference potential, at least one of said impedance means comprising a network of elements including a resistor R, a capacitor C and an inductor L, and the other of said impedance means including at least a resistor member.

2. A delay and equalizer circuit as set forth in claim 1 in which said second impedance means comprises said network of elements, and said second impedance means further includes a source of energy connected in a circuit with said network between said second amplifier input terminal and said point of reference potential and controlled by said network to compensate for the dissipation losses of said network.

3. A delay and amplitude equalizer circuit as set forth in claim 2 in which said source of energy comprises a negative immittance converter.

4. An adjustable active delay and amplitude equalizer circuit comprising an input circuit for providing input signals, an operational amplifier having a first and a second input terminal and an output terminal, first resistor means connecting said input circuit to said first amplifier input terminal, and second resistor means connecting the output terminal of said amplifier in a feedback connection to said first amplifier input terminal, and first and second impedance means connecting said input circuit to said second amplifier input terminal, said second impedance means comprising a resistor R, a capacitor C and an inductor L, connected to form an RLC circuit, and a controlled source of energy comprising a negative immittance converter connected in series with said RLC circuit to compensate for the energy lost through dissipation in said RLC circuit.

5. An adjustable delay and amplitude equalizer as set forth in claim 4 in which said resistor R is adjustable to control the amount of compensation provided by said energy source.

6. An adjustable delay and amplitude equalizer circuit comprising a circuit input terminal, a circuit output terminal, and a point of reference potential, a differential amplifier having a first and a second input terminal, and an output terminal connected to said circuit output terminal, a first resistance $R_1$ connecting said first amplifier input terminal to said circuit input terminal, a second resistance $R_2$ connecting said first amplifier input terminal to said amplifier output terminal, a first impedance $Z_1$ connecting said second amplifier input terminal to said circuit input terminal, and a second impedance $Z_2$ comprising a network of elements including a resistor R, a capacitor C and an inductor L connecting said second amplifier input terminal to said point of reference potential whereby the transfer function of said circuit is given by the expression:

$$\frac{R_2Z_1 - R_1Z_2}{R_1Z_1 + R_2Z_2}$$

7. A delay and amplitude equalizer circuit as set forth in claim 6 in which resistance $R_1$ is equal to resistance $R_2$.

8. A delay and amplitude equalizer circuit as set forth in claim 6 which said second impedance $Z_2$ includes compensating means connected in a circuit with said network between said second amplifier input terminal and said point of reference potential to supply energy to said equalizer circuit to compensate for losses introduced by said network.

9. A delay and amplitude equalizer circuit as set forth in claim 8 in which said compensating means includes a further resistance $R_7$, and a negative-immittance converter having an input terminal connected to said network and an output terminal connected through said further resistance $R_7$ to said point of reference potential, the gain of said converter being $K$, whereby the converter effectively provides a negative resistance of a magnitude $KR_7$ between said network and said point of reference potential.

10. A delay and amplitude equalizer circuit as set forth in claim 9 in which the resistor R of said network comprises adjustable resistance means for adjusting the signal level at the input terminal of said negative-immittance converter to control the amount of energy supplied to said equalizer circuit by said converter.

* * * * *